J. W. DOMETT.
Safety-Checks for Horses.

No. 135,208.            Patented Jan. 28, 1873.

WITNESSES      INVENTOR
                Joseph W. Domett
                By his Atty's.

UNITED STATES PATENT OFFICE.

JOSEPH W. DOMETT, OF BOSTON, MASSACHUSETTS.

IMPROVEMENT IN SAFETY-CHECKS FOR HORSES.

Specification forming part of Letters Patent No. 135,208, dated January 28, 1873.

*To all whom it may concern:*

Be it known that I, JOSEPH W. DOMETT, of Boston, in the county of Suffolk and State of Massachusetts, have invented an Improved Safety-Check for Horses, of which the following is a specification:

The objects of this invention are to give the driver a more perfect control over the horse and to prevent his running away when left alone, without using the weight or even hitching the animal. The nature of the invention is fully described below.

Figure 1:
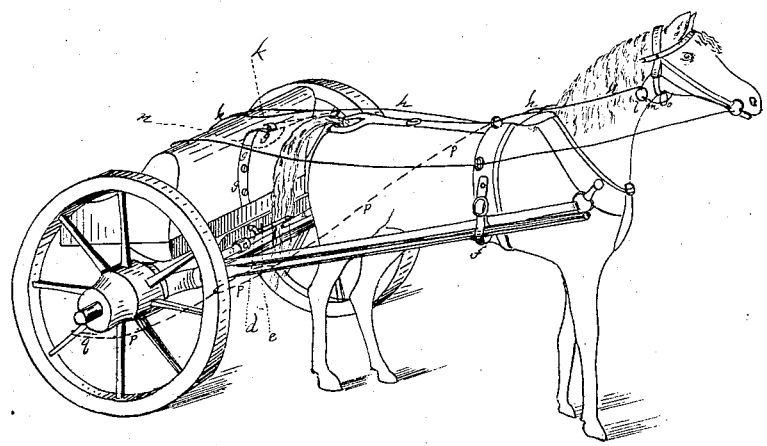
Figures 2, 3:
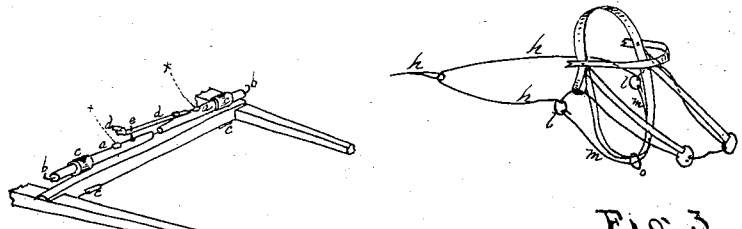

In the accompanying drawing, Figure 1 is a horse attached to a carriage, (the forward portion only of which is seen,) and in connection with which my invention is shown. Fig. 2 is a detached view of the whiffletree with a portion of the shafts. Fig. 3 is a view in perspective of the bridle and choker.

Similar letters of reference indicate corresponding parts.

$a\ a$ is the whiffletree, made in two pieces, and pivoted at the points $x\ x$. $b\ b$ are hooks to which the traces are attached. $c\ c$ are rubber springs passing around the whiffletree $a\ a$, behind the cross-bar, and attached to the under or front side thereof. $d$ is a spring fixed to one of the parts of the whiffletree $a\ a$. $e$ is a spindle attached to the other part of the whiffletree $a\ a$. The spring $d$ presses over the spindle $e$, (see Fig. 2,) and thus keeps the whiffletree firmly in place. $f$ is the shaft-lug, pivoted to the saddle, instead of being immovably fastened. $g$ is a spring fastened to the front of the dash-board. $h$ is the check-rein, which, instead of being caught in the water-hook, passes through a ring or terret, and thence back into the carriage. $k$ is a loop in the check-rein $h$, which can be caught in the spring $g$, as shown by the broken line $n$. $l\ l$ are rings attached to the check-rein $h$ on each side of the horse's neck. $m$ is a detachable strap or choker, each end of which is hooked into one of the rings $l\ l$, and which passes through a ring, $o$, which is attached to the throat-latch. The broken line $p\ p$ shows the position of the check-rein $h$ when caught in the wheel by means of the hook $q$.

In practical operation my invention works as follows: When driving, the check-rein is in the position shown in Fig. 1. In case the horse becomes unmanageable it is to be used to restrain him, and if the choker $m$ is attached any horse can be stopped, as he would choke to death if it were pulled long enough. In case the carriage is left the check-rein is to be caught in the vertical spring $g$, as shown by the broken line $n$, and the spring $d$ taken off from the spindle $e$. If the horse starts, the whiffletree $a\ a$ and springs $c\ c$ allow him to step forward slightly in the shafts, when he is caught and held by means of the check-rein, which is caught in the spring $g$, and holds him, the choker $m$, if it is attached, operating as above described.

If preferred, the check-rein may be placed in the position shown in the broken line $p$, the hook $q$ being caught in the wheel. The pivoted shaft-lug $f$, instead of allowing the shaft to slip easily through it, as it would if it were fixed vertically to the saddle, catches in the shaft as the horse advances, and, holding it, is an aid to stopping the animal.

It is understood that the choker $m$ may be used or not, as desired.

There are many advantages to my invention, the chief of which is the complete control which the driver has over the horse. A woman or child can control almost any horse by means of this device. As other advantages, might be mentioned the ease with which the horse may be unchecked.

My device prevents galling of the back or tail, as the strain is not on the saddle.

In case of the breaking of a trace or the driving-reins, the horse may be instantly stopped by means of the check-rein. Again, by taking off the spring $d$ entirely when leaving the horse, boys and thieves will be effectually prevented from stealing the team.

Having thus fully described my invention, what I claim, and desire to secure by Letters Patent, is—

1. The arrangement of the check-rein $h$ (with or without the hook $q$) and spring $g$, in combination with the whiffletree $a\ a$ and spring and spindle $d\ e$, constructed substantially as and for the purposes hereinbefore specified.

2. The combination and arrangement of the rein $h$, loop $k$, spring $g$, and choker $m$, substantially as and for the purposes above set forth.

3. The combination and arrangement of the whiffletree $a\ a$, rubber springs $c\ c$, spring $d$, and spindle $e$, as and for the purpose hereinbefore described.

JOSEPH W. DOMETT.

Witnesses:
 HENRY W. WILLIAMS,
 B. W. WILLIAMS.